O. L. BEARDSLEY.
SLED.
APPLICATION FILED AUG. 21, 1909.
1,066,445.
Patented July 1, 1913.
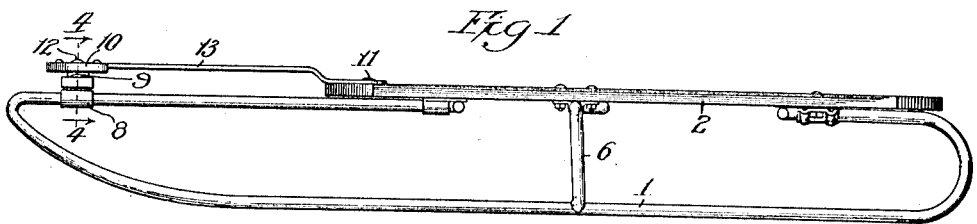
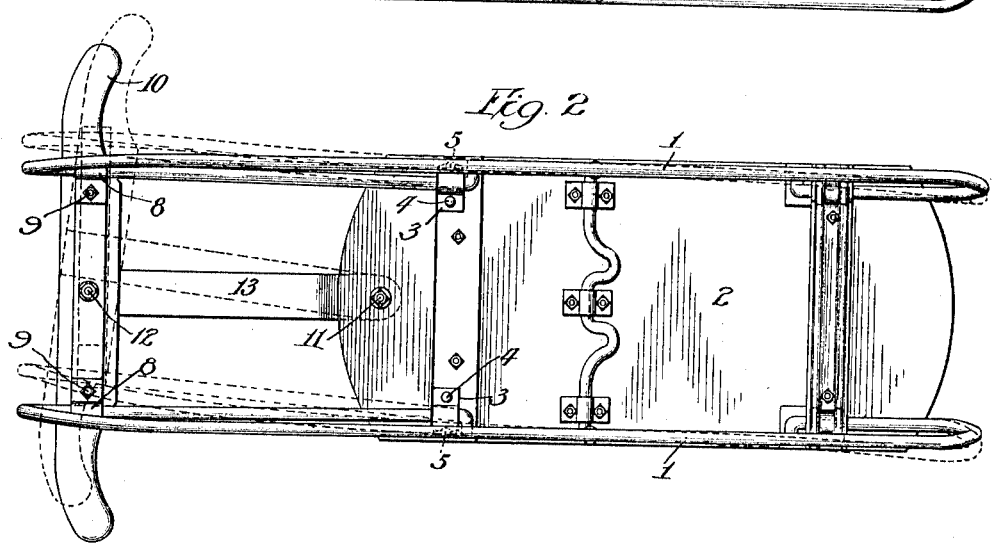
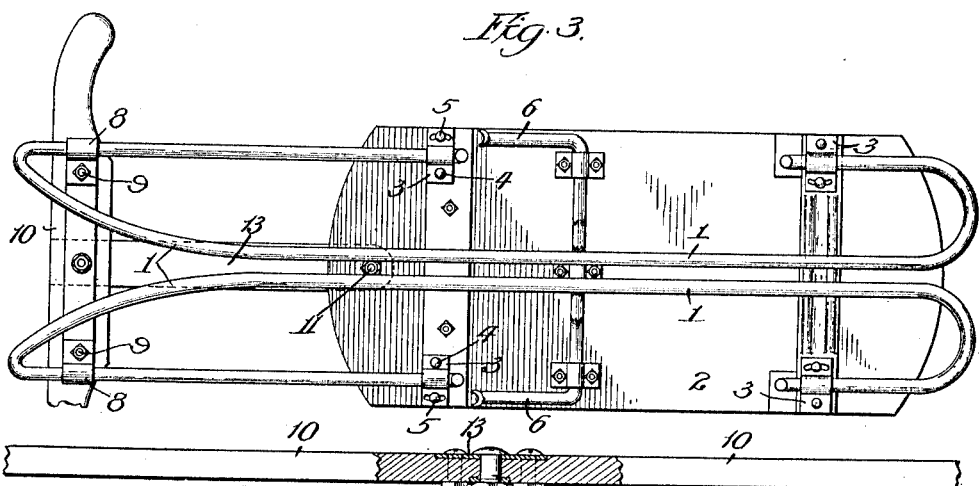
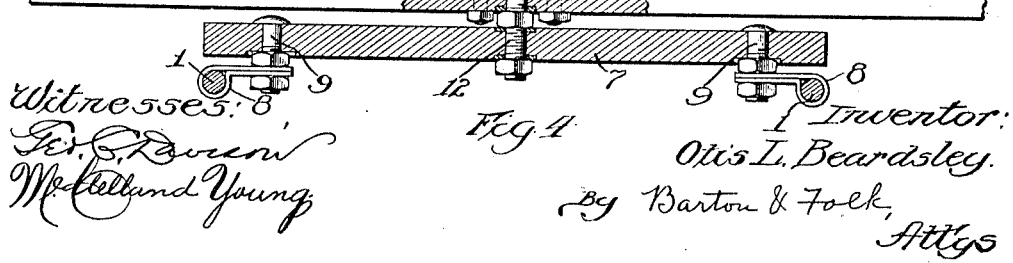
Witnesses:
Inventor:
Otis L. Beardsley.
By Barton & Folk,
Attys

UNITED STATES PATENT OFFICE.

OTIS L. BEARDSLEY, OF CHICAGO, ILLINOIS.

SLED.

1,066,445.

Specification of Letters Patent.

Patented July 1, 1913.

Application filed August 21, 1909. Serial No. 513,921.

*To all whom it may concern:*

Be it known that I, OTIS L. BEARDSLEY, citizen of the United States, residing at Chicago, in the county of Cook and State of Illinois, have invented a certain new and useful Improvement in Sleds, of which the following is a full, clear, concise, and exact description.

My invention relates to a sled and more particularly to a sled provided with foldable runners. Its object is to provide simple and efficient means for steering or guiding the course of the sled.

My invention comprises a sled having runners pivoted at each end to the body of the sled, in such manner as to permit of the folding of the runners, in combination with steering means, likewise pivotally connected to said runners, for guiding the course of the sled. One or both ends of each of the runners are preferably pivoted in plates which in turn are pivotally secured to the body of the sled to swing in an arc parallel to the surface of said body. The runners are thus capable of being swung laterally and are, therefore, more readily guided than if the mere flexing of the runners was alone depended upon for such purpose.

The several features of my invention may be more readily understood by reference to the accompanying drawings, in which, Figure 1 is a side elevation of a sled embodying my invention; Fig. 2 is a bottom plan view thereof, showing the runners in their open position; Fig. 3 is a bottom plan view, showing the runners in the folded position, and also showing a slightly modified means for securing the rear portion of the runners to the sled body; and Fig. 4 is a fragmentary view in longitudinal section of the transverse cross-bar which connects the forward ends of the runners and forms a portion of the steering mechanism.

Like letters of reference refer to like parts throughout the several views.

Apart from those features more particularly relating to the adaptation of the sled to the guiding control of a steering lever, the sled shown is similar to that disclosed in my Patent No. 907,217, dated December 22, 1908, and hence a detail description of such parts thereof as have been previously disclosed in said patent is unnecessary. It will be understood that while my present invention is preferably embodied in connection with the sled of the aforementioned patent, it is not limited to such particular structure.

The runners 1, 1 are shown as each consisting of a flexible metallic rod in the form of an elongated open loop having its ends pivoted to the body 2, so as to fold underneath said body. One or both ends of the runners are preferably provided with swinging pivots, as shown in Figs. 2 and 3, respectively, to permit of a lateral swinging movement of the runners to guide the course of the sled and also to permit of a folding pivotal movement. With this object in view the forward inturned ends of the runners are journaled in bearings provided by the plates 3, 3, one end of each of said plates being pivoted by vertical bolts 4 to the body of the sled and the other end of each of said plates being provided with an arc shaped slot through which extends the securing bolt 5. The plates 3 and consequently the runners 1, 1 have thus a limited swinging movement in a plane parallel with the surface of the body of the sled. If desired, pivoted plates 3 may be provided at each end of the sled as shown in Fig. 3, in which latter case the front plates 3 are preferably pivoted at their inner ends and the rear plates 3 at their outer ends to the body 2. In such case the runners 1 have a limited lateral swing about the brace arms 6 which engage with said runners. The flexibility of the runners also conduce to the ready lateral movement of the same to guide the course of the sled.

The forward ends of the runners project some distance beyond the body 2, and near the extreme forward portions of their inturned ends are connected to a cross-bar 7, which forms a portion of the steering mechanism, through the medium of metallic bands 8. Each of said bands 8 encircles the corresponding runner, the ends of the band being brought together and pivotally secured by a bolt 9 to the corresponding end of the cross-bar 7. The runners 1 are thus pivotally secured to the steering mechanism in such manner as to permit of the folding of said runners. The steering lever is substantially T-shaped, the ends of the transverse portion 10 of the T providing portions to be grasped by the hands. The free end of the leg 13 of the T is pivotally secured at 11 to the forward end of the sled body. The member 10 overlies the cross-bar 7 and is centrally pivoted thereto by means of a bolt 12.

My invention thus provides simple and efficient steering mechanism for guiding the course of a sled, without in anywise interfering with the folding of the runners.

I claim:

1. In a sled, the combination with a body, of a pair of foldable runners each consisting of a rod in the form of an elongated loop having its ends pivoted to said body, the front ends of said runners being provided with swinging pivots to permit of both a swinging and a pivotal movement of said ends, folding brace arms pivotally secured to said body and engaging with said runners, and steering means for swinging said runners laterally about said brace arms as pivoted points.

2. In a sled, the combination with a body, of a pair of foldable runners each consisting of a rod in the form of an elongated loop having its ends pivoted to said body, the front ends of said runners being provided with swinging pivots to permit of both a swinging and a pivotal movement of said ends, the forward ends of said runners projecting beyond said body, a cross-bar connecting said projecting ends, said cross-bar being pivotally connected at each end to the corresponding runner, and a T-shaped steering lever pivotally secured at the lower end and at the central transverse portion of the T to said body and to said cross-bar, respectively.

3. In a sled, the combination with a body, of a pair of foldable runners each consisting of a rod in the form of an elongated loop having its ends pivoted to said body, the front ends of said runners being provided with swinging pivots to permit of both a swinging and a pivotal movement of said ends, the forward portions of said runners projecting beyond said body, a cross-bar extending between said projecting portions, a metallic band encircling each of said projecting portions, each of said bands having its ends brought together and pivotally secured to the corresponding end of said cross-bar, and a T-shaped lever having its leg pivotally secured to said body and having its transverse portion overlying said cross-bar and pivotally secured to the center thereof.

4. In a sled, the combination with a body, of a pair of foldable runners each consisting of a rod in the form of an elongated loop having its ends pivoted to said body, both ends of said runners being provided with swinging pivots to permit of both a swinging and a pivotal movement of said ends, and steering means for swinging said runners laterally in either direction.

In witness whereof, I, hereunto subscribe my name this nineteenth day of August, A. D., 1909.

OTIS L. BEARDSLEY.

Witnesses:
GEO. C. DAVISON,
GEORGE E. FOLK.

---

Copies of this patent may be obtained for five cents each, by addressing the "Commissioner of Patents, Washington, D. C."